United States Patent
Paganelli

(10) Patent No.: US 9,252,441 B2
(45) Date of Patent: Feb. 2, 2016

(54) METHOD FOR DETECTING THE PERMEABILITY STATE OF THE ION EXCHANGER POLYMER MEMBRANE OF A FUEL CELL

(75) Inventor: Gino Paganelli, Cottens (CH)

(73) Assignees: COMPAGNIE GENERALE DES ESTABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 688 days.

(21) Appl. No.: 13/505,288

(22) PCT Filed: Oct. 27, 2010

(86) PCT No.: PCT/EP2010/066263
§ 371 (c)(1),
(2), (4) Date: Jul. 12, 2012

(87) PCT Pub. No.: WO2011/051341
PCT Pub. Date: May 5, 2011

(65) Prior Publication Data
US 2012/0270127 A1  Oct. 25, 2012

(30) Foreign Application Priority Data
Oct. 30, 2009 (FR) .................. 09 57646

(51) Int. Cl.
*H01M 8/04* (2006.01)
*H01M 8/10* (2006.01)
(52) U.S. Cl.
CPC ........ *H01M 8/04432* (2013.01); *H01M 8/0491* (2013.01); *H01M 8/04231* (2013.01); *H01M 8/04388* (2013.01); *H01M 8/04395* (2013.01); *H01M 8/04447* (2013.01); *H01M 8/04559* (2013.01); *H01M 8/04589* (2013.01); *H01M 8/04664* (2013.01); *H01M 8/04753* (2013.01); *H01M 8/04761* (2013.01); *H01M 8/04776* (2013.01); *H01M 8/0497* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| 7,901,821 | B2 | 3/2011 | Buchi et al. |
| 2002/0076583 | A1 | 6/2002 | Reiser et al. |
| 2004/0101734 | A1 | 5/2004 | Morishima et al. |
| 2004/0124843 | A1 | 7/2004 | Hamada et al. |
| 2006/0228601 | A1 * | 10/2006 | Yoshida .............. 429/22 |
| 2008/0038595 | A1 * | 2/2008 | Buchi et al. ........ 429/13 |
| 2008/0311439 | A1 * | 12/2008 | Paganelli .......... 429/13 |
| 2009/0220832 | A1 | 9/2009 | Reiser et al. |

FOREIGN PATENT DOCUMENTS

| CN | 1871735 | 11/2006 |
| CN | 101023548 | 8/2007 |

(Continued)

*Primary Examiner* — Ula C Ruddock
*Assistant Examiner* — Matthew Van Oudenaren
(74) *Attorney, Agent, or Firm* — Cozen O'Connor

(57) ABSTRACT

Procedure for detecting the permeability state of the polymeric ion-exchange membrane of a fuel cell stack, in which, as soon as the pressure difference in the anode and cathode circuits drops to a value below a threshold value $P_S$, the pressure variation in said circuits for a predetermined time period $t_C$ is measured and the pressure difference in these circuits at the end of a predetermined time period, called the control pressure $P_C$, is calculated and a warning is given when the control pressure $P_C$ is below a warning threshold $P_A$.

15 Claims, 4 Drawing Sheets

(56) References Cited

FOREIGN PATENT DOCUMENTS

| JP | 2004-178902 | 6/2004 |
| JP | 2004-192919 | 7/2004 |
| JP | 2006-032098 | 2/2006 |
| JP | 2007-323863 | 12/2007 |
| JP | 2008-507103 | 3/2008 |
| JP | 2009 146651 | 7/2009 |
| WO | WO2004112179 | * 12/2004 |
| WO | WO 2006/012954 | 2/2006 |
| WO | WO 2009/041271 | 4/2009 |

* cited by examiner

METHOD FOR DETECTING THE PERMEABILITY STATE OF THE ION EXCHANGER POLYMER MEMBRANE OF A FUEL CELL

RELATED APPLICATIONS

This is a U.S. National Phase Application under 35 USC 371 of International Application PCT/EP2010/066263 filed on Oct. 27, 2010.

This application claims the priority of French Application No. 09/57646 filed Oct. 30, 2009, the entire content of which is hereby incorporated by reference.

FIELD OF THE INVENTION

The present invention relates to fuel cell stacks, in particular, but not exclusively, to fuel cell stacks of the type having an electrolyte in the form of a polymeric membrane (i.e. of the PEFC (Polymer Electrolyte Fuel Cell) type).

BACKGROUND OF THE INVENTION

It is known that fuel cell stacks produce electrical energy directly via an electrochemical redox reaction using hydrogen (the fuel) and oxygen (the oxidant) without passing via a mechanical energy conversion step. This technology seems promising, especially for motor vehicle applications. A fuel cell stack comprises in general the series combination of unitary elements each consisting essentially of an anode and a cathode separated by a polymeric membrane allowing ions to pass from the anode to the cathode.

It is very important to have permanently available a precise evaluation of the permeability of the ion-exchange membrane of each cell of a fuel cell stack so as to monitor its state of ageing and to be able to stop the use of the cell if safety were to be compromised. Although the principle of measuring the permeability of an ion-exchange membrane by pressure difference is conventional, in practice only investigatory methods are known that dictate the use of appropriate equipment and a manual procedure. For example, an external nitrogen bottle is used which is connected to one of the circuits, either the anode or the cathode circuit, and the loss of gas to the other circuit is observed.

Patent application US 2004/124843 provides a method for determining the individual permeability of each ion-exchange membrane of a fuel cell stack. To do so, the anode is supplied with hydrogen and the cathode is supplied with nitrogen or with another inert gas. According to the Nernst's equation, the difference in nature of the gas on either side of the membrane generates a potential difference that depends inter alia on the nature and the concentration or partial pressure of these gases. It appears that if a membrane is particularly permeable, the hydrogen will diffuse on the cathode side, and vice versa, thus modifying the nature of the gas mixture on either side of the membrane and consequently also modifying the potential difference measured on this cell. The method entails a voltage measurement, a measurement of the pressure within the anode circuit and of the pressure within the cathode circuit and a temperature measurement in order to solve the Nernst's equation, so as to detect whether one or more membranes mounted within a fuel cell stack have a permeability defect.

However, this method suffers from the following implementation difficulties:

the theoretical potential difference with pure hydrogen at the anode and pure nitrogen at the cathode is at most a few tens of mV, which implies a very accurate voltage measurement apparatus;

determination of the permeability involves flow rate measurements, which in practice are difficult to carry out with great precision for gas mixtures;

the slightest trace of residual oxygen at the cathode may generate a voltage difference much higher than the expected voltage level and therefore falsify the measurement, yet it is well known that in practice it is very difficult to guarantee complete disappearance of a gas, most particularly in the presence of an absorbent support such as the GDL (gas diffusion layer) contained in a membrane electrode assembly (MEA); and finally, this method involves a particular way of conditioning the system and requires a source of nitrogen or another inert gas being available. The method is therefore difficult to automate, most particularly in the context of onboard applications.

Patent application WO 2006/012954 discloses a procedure with no nitrogen injection phase, including a phase of venting the cathode circuit to atmosphere. The fuel cell stack described in that text does not contain a booster pump for air injection. It follows that the pressure at the cathode cannot be raised above atmospheric pressure. The pressure differential with the anode will therefore be insufficient for carrying out the automatic membrane permeability measurement. In addition, evaluating the permeability of the ion-exchange membranes of a fuel cell stack remains completely outside the disclosure of this document.

Patent application US 2009/0220832 proposes a fuel cell stack comprising a recirculation loop to the cathode and to the anode, and valves for isolating the internal circuits of the stack from the atmospheric air. However, the proposed arrangement of the components and the procedure described are intended to inundate the circuits of the stack with practically pure hydrogen, which is neither safe nor economic. Moreover, evaluation of the permeability of the ion-exchange membranes of a fuel cell stack remains entirely outside of the disclosure of this document.

SUMMARY OF THE INVENTION

One object of the present invention is to be able to measure the permeability of the ion-exchange membrane of the cells of a fuel cell stack automatically, after each extinction, in order to monitor and diagnose a fuel stack, but without requiring additional equipment merely to provide a monitoring function, that is to say without providing any usefulness as regards the normal operation of the fuel cell stack.

One aspect of the invention is directed to a procedure for detecting the permeability state of the polymeric ion-exchange membrane of a fuel cell stack, the fuel cell stack being formed by stacking electrochemical cells each having an anode and a cathode on either side of a polymeric ion-exchange membrane, the fuel cell stack having a fuel gas supply system on the anode side of the electrochemical cells and an oxidant gas supply system on the cathode side of the electrochemical cells. The procedure includes, upon each shut-down of the fuel cell stack, measuring the dynamic behaviour as the pressure in the anode circuit and the pressure in the cathode circuit come to equilibrium and, when said dynamic behaviour exhibits pre-identified characteristic signs, a warning signal indicating that the fuel cell stack requires inspection is activated.

Specifically, the applicant has observed that, when said dynamic behaviour exhibits pre-identified characteristic signs, precise examples of which are given below, the permeability of the polymeric ion-exchange membrane becomes too high, which may impair safety, efficiency and durability.

According to one aspect of the invention, to evaluate dynamic behaviour, as soon as the pressure difference in the anode and cathode circuits drops to a value below a threshold value $P_S$, the variation in pressure in said circuits is measured during a predetermined time period $t_C$, the pressure difference in these circuits at the end of a predetermined time period, called the control pressure $P_C$, is calculated and a warning is given when the control pressure $P_C$ is below a warning threshold $P_A$.

According to one aspect of the invention, to evaluate said dynamic behaviour, instead of measuring the pressure difference at the end of a given time, the time to reach a given pressure difference is measured. Of course, the invention covers other ways of evaluating said dynamic behaviour.

An embodiment of the invention takes into account that the time needed for the pressures between the gas circuits on the anode side and the cathode side to come to equilibrium may advantageously provide an indication about the permeability of the membranes. The permeability of the membranes is in fact a highly significant factor in revealing the state of health of a fuel cell stack. Therefore, under conditions in which the nature of the gases present on either side of the membrane is controlled and allows no electrochemical reaction, and the respective pressure thereof is sufficiently different, for example after each shutdown, by applying a procedure that allows the fuel cell stack to be supplied in this situation favourable to the intended ageing measurement, the variation over time of the pressure difference is an excellent indicator of the ageing of the fuel cell stack.

Preferably, the procedure for detecting the permeability state of the polymeric ion-exchange membrane of a fuel cell stack is preceded by a procedure for shutting down the fuel cell stack, the latter delivering an electrical voltage to an electrical power line (10), the shut-down procedure comprising the following actions:
 (i) the supply of fuel gas and oxidant gas is cut off;
 (ii) current continues to be drawn as long as an appropriate indicator indicates that the oxidant gas in the oxidant gas supply system has not been sufficiently consumed; and
 (iii) nitrogen-enriched gas is injected into the oxidant gas supply system.

The actions (i), (ii) and (iii) could all be concomitant. To make the following description better understood, the actions (ii) and (iii) are successive steps, the two actions (i) and (ii) being concomitant. It is also useful to provide, after the action (iii), a fuel gas suction step, as is also shown in the description of the shut-down procedure illustrating the invention.

By virtue of the shut-down procedure provided above, the hydrogen diffuses into the cathode only very slowly through the polymeric ion-exchange membrane and after extinction, that is to say after all the oxygen has been consumed and the cathode circuit has been filled with nitrogen. Oxygen and hydrogen therefore never cohabit in significant amount. The hydrogen supply is interrupted right from the start of the procedure and simultaneously or almost simultaneously with the cutting-off of the oxidant gas supply. Although the action of interrupting the fuel gas supply could be somewhat delayed relative to the action of interrupting the oxidant gas supply, it may not be significantly delayed. The following description is limited only to the case in which the supply of oxidant gas and the supply of fuel gas are interrupted simultaneously, which is the simplest procedure to control and gives entirely satisfactory results. All the residual hydrogen at the anode is parsimoniously used to guarantee the desired $H_2/N_2$ mixture.

It should be noted that the shut-down procedure proposed above extends to a fuel cell stack in which the additional fuel gas accumulation chamber could be placed at any point in the fuel gas supply circuit, that is to say at any point between the cut-off valve and the fuel cell stack, even in the recycling circuit, or in the circuit between the water separator and the ejector. However, it is advantageous to place it at a point in the circuit where the pressure is highest so as to reduce the volume thereof, as specified in the description of the above fuel cell stack.

Preferably, to implement the invention, the fuel cell stack comprises at the same time a pressurized oxygen feed coming from an oxygen storage tank, a device for filling with pressurized atmospheric air, and a recycling circuit connected to the outlet of the cathode circuit of the fuel cell stack.

In the rest of the description, the invention is illustrated by considering a fuel cell stack supplied with pure oxygen as oxidant gas. However, this aspect is not limiting, it being possible for the invention also to apply to fuel cell stacks supplied with ambient air. The embodiment described (pure oxygen supply) is conducive to the compactness of the stack for a given power, thereby constituting an embodiment favourable for applications in transport vehicles, in particular in motor vehicles.

In any case, as regards the electrolyte, an embodiment of the invention applies to fuel cell stacks of the type having an electrolyte in the form of a polymeric membrane (that is to say one of the PEFC type). The electricity generator and the shut-down procedure described below prove to be particularly suitable for being installed and implemented in a motor vehicle.

BRIEF DESCRIPTION OF THE DRAWINGS

The rest of the description serves to make all the aspects of the invention clearly understood by means of the appended drawings in which.

DESCRIPTION OF THE PREFERRED EMBODIMENTS OF THE INVENTION

For safety reasons, fuel cell stacks are generally equipped with an $H_2$ cut-off valve which remains closed during shutdowns. In this case, it is not possible to draw $H_2$ into the tank during the extinction procedure. The fuel cell stack must therefore function with only the residual hydrogen in its channels, ducts, internal dehumidifying reservoirs and other components of the supply line going from the safety valve to the actual fuel cell stack, these components being denoted hereafter in general as the supply circuit for the fuel cell stack.

Figure 1:
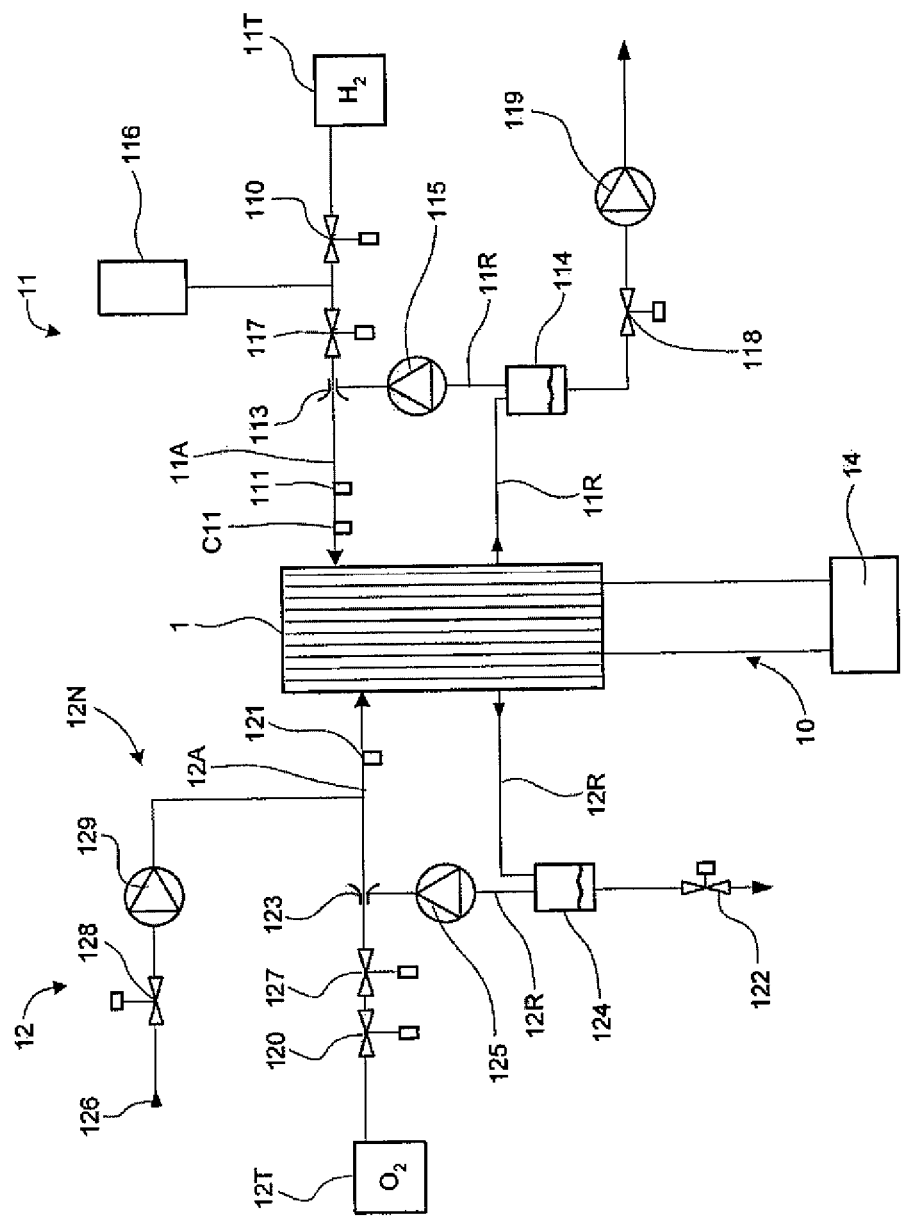
FIG. 1 is a diagram of an electricity generator using a fuel cell stack, supplied with pure oxygen.

FIG. 1 shows a fuel cell stack 1 of the type having an electrolyte in the form of a polymeric membrane (i.e. of the PEFC or PEM (proton exchange membrane) type). The fuel cell stack 1 is supplied with two gases, namely the fuel (hydrogen stored or generated on board the vehicle) and the oxidant (pure oxygen), which gases supply the electrodes of the electrochemical cells. An electrical load 14 is connected to the fuel cell stack 1 via an electrical line 10. To simplify matters, FIG. 1 shows only the gas circuit components useful for understanding the invention.

Description of the Anode Circuit

The installation comprises a fuel gas supply circuit 11 on the anode side. A pure hydrogen ($H_2$) tank 11T is visible, this being connected to the inlet of the anode circuit of the fuel cell stack 1 by means of a supply line that passes via a cut-off valve 110, then via an ejector 113 and then via a fuel gas supply channel 11A terminating at the cathodes. A pressure probe 111 is installed in the supply channel 11A just before the inlet into the fuel cell stack 1. Forming part of the hydrogen (fuel) supply circuit 11 is a circuit 11R for recycling the hydrogen not consumed by the fuel cell stack, said circuit being connected to the outlet of the anode circuit of the fuel cell stack 1. A water separator 114 is installed in the recycling circuit 11R. The ejector 113 and a recirculating pump 115 recycle the unconsumed hydrogen and mix it with fresh hydrogen coming from the tank.

An additional accumulation chamber 116 is also visible, this being placed on the piping of the fuel gas supply circuit 11, between the cut-off valve 110 and the pressure regulating valve 117. The additional accumulation chamber is, in this preferred embodiment, placed at the point where the pressure is highest in the supply circuit, so as to lessen the volume thereof or, for the same volume, to stock a larger amount of hydrogen. It should be noted that the additional accumulation chamber 116 could be placed at any point in the fuel gas supply circuit, that is to say at any point between the cut-off valve 110 and the fuel cell stack 1, even in the recycling circuit 11R or in the circuit between the water separator 114 and the ejector 113. However, it is advantageous to place it at a point in the circuit where the pressure is highest, so as to reduce the volume thereof.

A suction pump 119 and a cut-off valve 118 that are installed on a line venting to atmosphere and connected below the water separator 114, can also be seen. The connection at this point, shown in FIG. 1, makes it possible, by controlling the cut-off valve 118, to provide three functions, namely water discharging, purging and hydrogen suction. However, this embodiment detail is not limiting. To provide the more specific hydrogen suction function of the present invention, the line having the cut-off valve 118 could be connected to the line connecting the separator 114 to the recirculating pump 115.

A hydrogen concentration sensor C11 may advantageously be inserted into the anode circuit so as to check there is no hydrogen starvation during the extinction procedure and, where appropriate, to limit the injection of air by the booster pump (see description of the cathode circuit), which may occur for example if the hydrogen pressure is abnormally low and does not ensure the sufficient amount of hydrogen for completing the extinction procedure. Such a hydrogen sensor C11 is installed as shown in FIG. 1.

Description of the Cathode Circuit

The installation also includes an oxidant gas supply circuit 12 on the cathode side. A pure oxygen ($O_2$) tank 12T is visible, this being connected to the inlet of the cathode circuit of the fuel cell stack 1 by means of a supply line that passes via a cut-off valve 120, then via a pressure regulating valve 127, then via an ejector 123 and then via an oxidant gas supply channel 12A terminating in the cathodes. A pressure probe 121 is installed in the supply channel 12A just before the inlet into the fuel cell stack 1. Forming part of the oxygen supply circuit 12 is a circuit 12R for recycling the oxygen not consumed by the fuel cell stack, connected to the outlet of the cathode circuit of the fuel cell stack 1. A water separator 124 is installed in the recycling circuit 12R. The ejector 123 and a recirculating pump 125 recycle the unconsumed oxygen and mix it with fresh oxygen coming from the tank.

A purge valve 122 is connected to the bottom of the water separator 124. This valve thus provides two functions, removal of the water and venting of the oxygen circuit to atmosphere. As a variant, this purge valve 122 could be connected just at the gas outlet of the fuel cell stack 1, branched off the line between the fuel cell stack 1 and the water separator 124, if it is desired to vent the oxygen circuit to atmosphere independently of draining the water in the water separator 124. It goes without saying that, in all cases, the function of draining water from the water separator 124 and from the water separator 114 must be ensured.

The fuel cell stack according to the invention includes a filling device 12, for filling the cathode circuit with pressurized atmospheric air. The filling device 12 comprises the following components: a line starting with an air intake orifice 126 and, installed on said line, a cut-off valve 128 and a booster pump 129, the line terminating in the oxygen supply circuit, just upstream of the fuel cell stack 1. We should point out that the atmospheric air filling device 12 could terminate at any point in the loop of the oxidant gas supply circuit 12, said loop being formed by the recycling circuit 12R and by the line connecting the ejector 123 to the fuel cell stack 1.

Description of a Preferred Extinction Procedure

The procedure described below makes it possible to extinguish the fuel cell stack so as to guarantee storage with a hydrogen/nitrogen mixture therein, without requiring a nitrogen bottle. This procedure is recommended because it terminates by naturally leaving the fuel cell stack with a sufficient pressure differential between the anode and the cathode so as to be able to measure the permeability state of the membranes. In addition, it is conducive to stable conditions in terms of the nature of the gases, the humidity, and the temperature and pressure, thereby guaranteeing better repeatability of the membrane permeability state measurement.

The shut-down procedure is essentially made up of 3 phases, resulting from various commands that are explained:
- $1^{st}$ phase: residual oxygen consumption phase, which occurs upon cutting off the fuel gas supply and oxidant gas supply, and by drawing a current $I_s$ at the terminals of the fuel cell stack. This current draw $I_s$ is maintained as long as an appropriate indicator indicates that the oxidant gas in the oxidant gas supply system has not been sufficiently consumed. An appropriate indicator is for example the pressure in the cathode circuit;
- $2^{nd}$ phase: neutralization phase that occurs when filling the cathode circuit with nitrogen. In the embodiment described here, the nitrogen is that of the atmospheric air. Forced injection of atmospheric air then takes place, thereby again introducing a little oxygen, the consumption of which must be controlled; and
- $3^{rd}$ phase, which is optional, during which, after the electrochemical processes have been completely shut down, by forcibly removing any excess fuel gas (here, forced suction of the excess hydrogen). It should be emphasized that, by virtue of the invention, this suction takes place only after the fuel cell stack has been brought into a state in which the precautions for avoiding insufficient supply of hydrogen, the serious consequences of which are known, have been taken.

Figure 2:
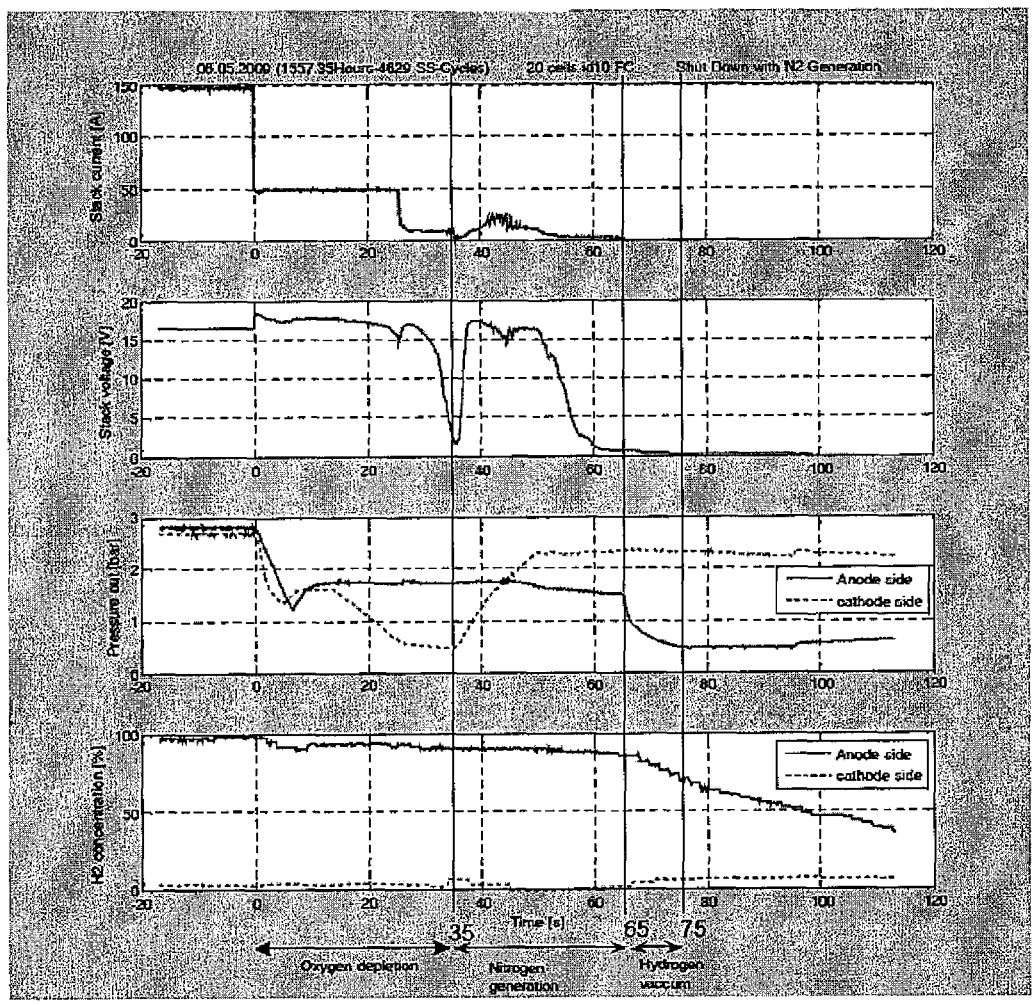
FIG. 2 shows the variation of various parameters during the extinction of a fuel cell stack.

FIG. 2 illustrates the sequence of the three phases during a shut-down actually measured on a fuel cell stack comprising twenty cells having an active area of 300 $cm^2$, operating with pure oxygen. The x-axis indicates the time in seconds, with as reference (0) the instant when the shut-down procedure starts. This figure shows the variation of the following quantities as a function of time during a shut-down with nitrogen generation:

Curve 1, the y-axis of which is labelled "stack current [A]", showing the current drawn from the fuel cell stack, expressed in amps;

Curve 2, the y-axis of which is labelled "stack voltage [V]", showing the total electrical voltage across the terminals of the fuel cell stack, expressed in volts;

Curve 3, the y-axis of which is labelled "pressure out [bar]", showing the pressure within the anode compartment (hydrogen: solid line) and in the cathode compartment (oxygen: dotted line), expressed in bara; and Curve 4, the y-axis of which is labelled "H2 concentration [%]", showing the hydrogen concentration in the anode compartment (hydrogen: solid line) and in the cathode compartment (oxygen: dotted line), expressed in %.

During the first phase of the extinction (0 to 35 s, marked "oxygen depletion" in FIG. 2), starting from the moment when the oxygen supply is cut off (by closing the cut-off valve 120 at the same instant that the cut-off valve 110 is closed, cutting off the hydrogen supply), the residual pure oxygen in the fuel cell stack is first partially vented to atmosphere via the momentary opening of the purge valve 122, and then the rest consumed by drawing a current. As the first curve indicates, this current is firstly established at 50 A, and it is then reduced at the same time that some of the cells of the fuel cell stack start to drop in voltage and is finally stopped at 35 s when the voltage of the fuel cell stack approaches 0 V. The third curve indicates that the pressure in the oxygen compartment drops to less than 500 mbara (as is usual in the field of fuel cell stacks, "mbara" means "millibar absolute", the final letter "a" denoting "absolute"). However, despite the consumption associated with current production, the hydrogen pressure remains at 1.75 bara because of the presence of the hydrogen buffer tank 116.

As already emphasized in the introductory part of this patent application, the extinction procedure according to the invention may also apply to fuel cell stacks supplied with ambient air. To implement the shut-down procedure proposed by the invention for a fuel cell stack supplied with air, unlike the usual supply scheme for such a fuel cell stack, the oxidant gas circuit must include a loop for circulating the air not consumed by the fuel cell stack, at least during the shut-down procedure. Therefore forming part of the air supply circuit 11 is a recycling circuit 12R for recycling the air not consumed by the fuel cell stack, connected to the outlet of the cathode circuit of the fuel cell stack 1, before a return and a direct connection (with no ejector nor a water separator, which are unnecessary in this configuration) to the supply line.

Let us return to the description of the shut-down procedure for a fuel cell stack supplied with pure oxygen. At the time 35 s ("35" on the time axis in FIG. 2), the air booster pump 129 is activated in order to pressurize the cathode circuit to a constant pressure of 2.2 bara (parameter 1), which is reached at 50 s. The oxygen thus supplied causes the fuel cell stack voltage to rise again. A current is drawn once more until the voltage of the fuel cell stack again becomes zero. In the meantime, the booster pump 129 is monitored so as to keep a constant pressure.

Incidentally, it should be remembered that all the curves detailed below relate to a fuel cell stack supplied with pure oxygen as oxidant, the nitrogen-enriched gas being the atmospheric air. However, it should be pointed out that, on the one hand, the nitrogen-enriched gas could be pure nitrogen and that, of course, in this case, the curves would have a different appearance after the instant "35 seconds" since the nitrogen injection would not be accompanied by a new supply of oxygen.

Let us return to the case described, namely the case of a fuel cell stack supplied with pure oxygen as oxidant. As the current is being consumed, the air present at the cathode becomes increasingly depleted in oxygen before finally containing only predominantly nitrogen, as revealed by the voltage across the terminals of the fuel cell stack becoming zero at the 65 s instant.

At this moment (65 seconds after the oxygen (120) and hydrogen (110) supplies have been cut off), the air booster pump 129 is stopped and the hydrogen suction pump 119 is activated, so as to remove the excess hydrogen. The suction pump 119 remains activated until the hydrogen pressure reaches 0.5 bara (parameter 2). This pressure is reached at the 75 s instant. The procedure is then terminated, the booster pump 129 and the suction pump 119 are stopped and the cut-off valves 118 and 128 are closed.

Throughout the entire extinction procedure, the recirculating pump 125 on the cathode side is kept in operation so as to ensure good homogeneity of the gas and to ensure complete consumption of the oxygen, preventing the appearance of zones with a higher oxygen concentration locally. The recirculating pump 115 on the anode side is also kept in operation so as to avoid any local hydrogen starvation. Throughout the extinction period, hydrogen starvation is avoided as the hydrogen consumption shown by the fourth curve indicates. The concentration remains above 85% in the anode circuit until the 65 second instant, when the hydrogen suction starts.

In the procedure described above, the first two phases (residual oxygen consumption and neutralization by means of nitrogen injection) take place in succession. However, they could just as well be concomitant. For greater rapidity of extinction, it is desirable to make them occur simultaneously. The final phase (excess hydrogen suction) is not always essential. The hydrogen buffer tank may in fact be designed so that the procedure terminates with the desired amount of hydrogen as explained below.

The internal volume of the fuel gas supply circuit 11 is designed to be greater than the internal volume of the oxidant gas supply circuit 12 and, in normal operation, the pressure within the oxidant gas supply circuit 12 and the pressure within the fuel gas supply circuit 11 are such that, given the internal volume of the oxidant gas supply circuit 12 and the internal volume of the fuel gas supply circuit 11, the number of moles of fuel gas always available at the start of the extinction process in the fuel gas supply circuit is greater than or equal to twice the number of moles of oxygen consumed in the oxidant gas supply circuit during the entire extinction procedure, that is to say until the cathode circuit is essentially filled with nitrogen at the desired pressure.

Thus, in a simple adaptation to be calculated and implemented, it is possible to ensure that the fuel gas supply circuit always contains sufficient gas for the extinction of the fuel cell stack to result from the oxygen in the oxidant gas supply circuit being exhausted.

Let us see how to calculate the volumes of the anode circuit 12 and the cathode circuit 11. Let $m_{o2}$ be the amount of oxygen, expressed for example in moles, that has to be completely consumed over the entire extinction. This is the residual oxygen in the cathode circuit at the start of extinction less the amount that it is possible to purge, plus the amount which is introduced with the air introduced by the booster pump 129 to generate the nitrogen.

Since the gas consumption is twice as high on the hydrogen side, the volumes of the anode and cathode circuits must be sized so as to guarantee that:

$$m_{h2} \geq 2 \times m_{o2} + res_{h2}$$

where $m_{h2}$ is the amount of hydrogen, expressed in moles, available at the start of extinction in the internal volume of the fuel gas supply circuit (pipes, channels, bipolar plates, supply line downstream of the cut-off valve 110) and $res_{h2}$ is the desired amount of residual hydrogen, also expressed in moles. The amount of hydrogen $m_{h2}$ finally necessary will be obtained by adjusting the volume of the additional accumulation chamber 116.

The amounts $m_{o2}$ and $m_{h2}$ are admittedly linked to the volume of the corresponding circuits that it is necessary to dimension, but they also depend on the pressure prevailing therein. This is a simplified approach since it would normally be necessary also to take account of the temperature of the gas and the nonlinearity of the hydrogen density as a function of the pressure. However, taking the pressure into account proves to be sufficient for the desired precision. The volumes have to be calculated for the most unfavourable pressure and temperature conditions that may be encountered, that is to say the minimum possible pressure in the hydrogen circuit at the start of extinction and the maximum possible residual pressure in the oxygen circuit.

However, in the case of a supply pressure variation, the execution of the procedure with an excess of hydrogen and a final suction guarantees that there is no hydrogen starvation and also better reproducibility of the final conditions.

At the end (75 seconds after the oxygen supply and hydrogen supply have been cut off) of the shut-down procedure, there remains a pressure difference between the anode and the cathode, in the example above 2.2 bara at the cathode and 0.5 bara at the anode. The time needed for the pressures to equilibrate is advantageously used to give an indication of the permeability of the membranes. The permeability of the membranes is indeed a parameter highly indicative of the state of health of a fuel cell stack. Furthermore, the undetected appearance of holes in the membranes also compromises safety. Therefore, regular monitoring of their permeability is also useful for safety purposes.

For example, after each shut-down, as soon as the pressure difference drops to 500 mbar, the unit for controlling the fuel cell stack measures the variation in pressure over the following 60 seconds. The value obtained changes with the ageing of the fuel cell stack and constitutes an excellent indicator.

Although the principle of measuring the permeability by pressure difference is conventional, the advantage of the invention is to offer the possibility of being able to measure the permeability automatically, after each extinction, this being a considerable advantage for monitoring and diagnosing a fuel cell stack.

Figure 3:
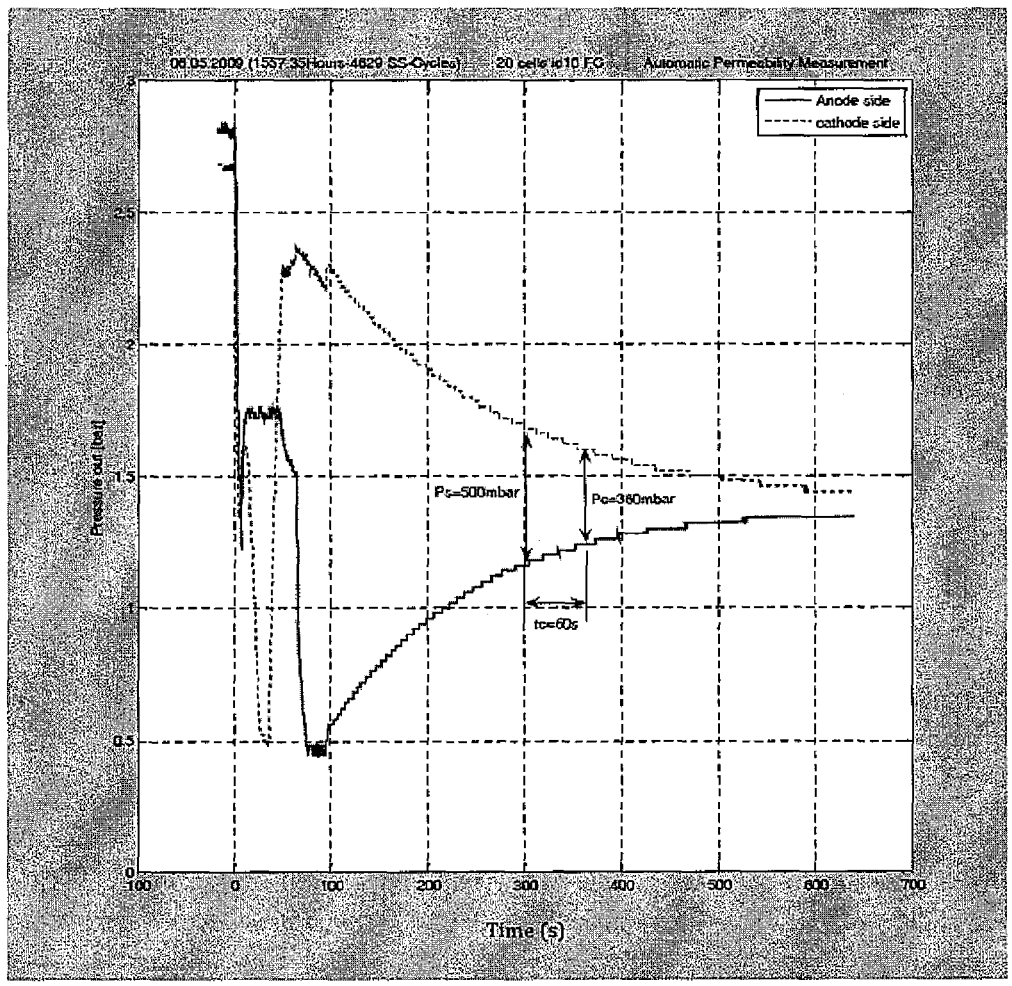
FIG. 3 shows the variations of the pressures after an extinction and illustrates the principle of measuring the permeability.

Referring to FIG. 3, showing the variation in the pressures on the anode side and cathode side over a longer period than in FIG. 2, comprising the extinction procedure described above and extending to the 10 or so minutes thereafter, the difference between these curves gives a direct measurement of the pressure difference between these two circuits. It may be seen that a threshold value $P_S$ of 500 mbar is reached after a time of about 300 seconds, i.e. 225 seconds after the extinction procedure has finished. Next, the pressure difference at the end of an additional time period $t_C$, for example a time of 60 seconds, is systematically recorded, that is to say at each shut-down of the fuel cell stack, thereby giving in this example, that is to say for the fuel cell stack used to record the curves of FIGS. 2 and 3, a control pressure $P_C$ of 360 mbar, that is to say a drop in the pressure difference at the anode and cathode circuits of 140 mbar.

Figure 4:
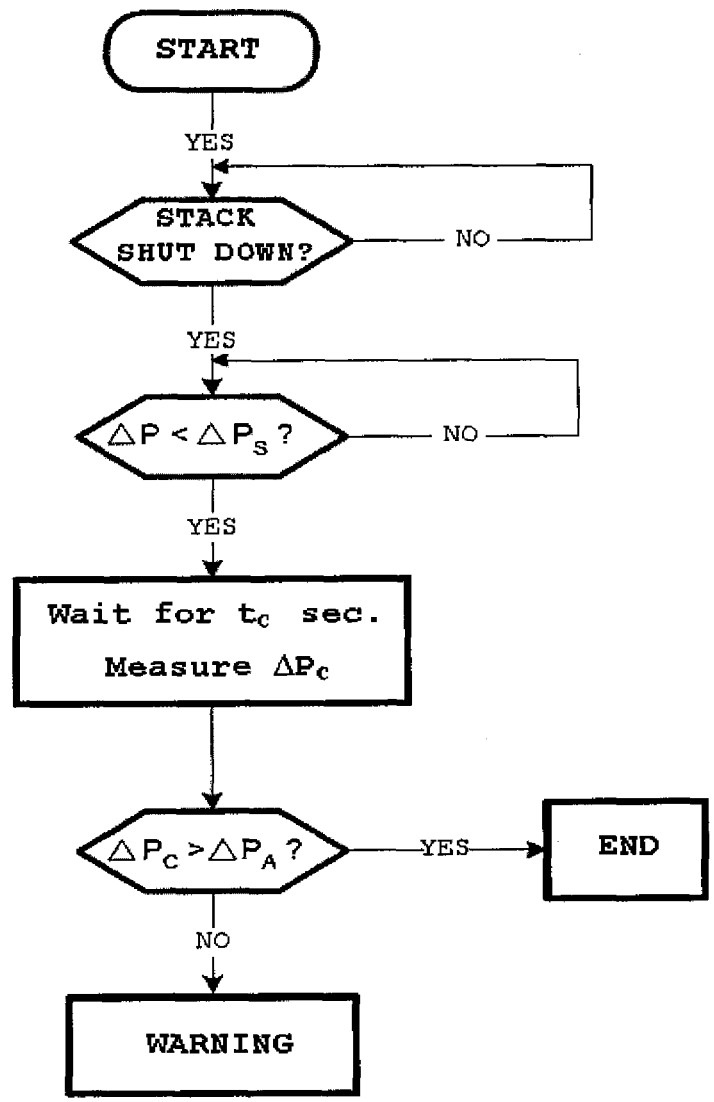
FIG. 4 shows a flowchart of the procedure for detecting the permeability state of the polymeric ion-exchange membrane according to the invention.

Thus, the invention proposes a procedure for detecting the permeability state of the polymeric ion-exchange membrane of a fuel cell stack in which, as soon as the pressure difference $\Delta P$ in the anode and cathode circuits drops to a value below a threshold value $\Delta P_S$ (see FIG. 4, the stack being considered as shut down, test on $\Delta P$), the variation in pressure in said circuits for a predetermined time period $t_C$ (see, in FIG. 4, "wait for $t_C$ seconds") is measured (see, in FIG. 4, "measure $\Delta P_C$") and the pressure difference in these circuits at the end of a predetermined time period, called the control pressure $P_C$, is calculated and a warning is given when the control pressure $P_C$ is below a warning threshold $P_A$.

It therefore suffices to set up an experimental design for correlating the control pressure values $P_C$ at the end of a predetermined time period $t_C$ with the degradation of the ion-exchange membrane, thereby enabling fuel cell ageing to be automatically monitored. In order for this measurement to be significant, it is necessary to ensure that the initial parameters that influence the dynamic behaviour whereby the pressure of the gases comes to equilibrium, for example the nature of the gases, their pressure, their temperature and that of the fuel cell stack, can be identically reproduced. The experimental observations by the applicant indicate that, in practice, the warning pressure $P_A$ may for example be set at 400 mbar.

As regards the nature of the gases and the pressure, the shut-down procedure described above provides good conditions and allows very good repeatability, namely pure hydrogen at the anode at a pressure of 500 mbara and pure nitrogen at the cathode at a pressure of 2.2 bara. It is in fact necessary to guarantee that the gases present allow no electrochemical activity, which would make the permeability measurement by pressure variation inoperable. As regards the temperature, the operating temperature of a fuel cell stack is generally controlled so as to remain at a nominal temperature. If the fuel cell stack has to be shut down before it can reach its nominal temperature, it would then be necessary not to carry out the permeability measurement since the result would not be representative, the permeability of PEFC membranes being temperature-dependent. Humidity also affects the permeability of the membranes, but this parameter is, however, necessarily controlled during the normal operation of the stack and therefore can be considered as constant. It is also clearly understood that the anode and cathode circuits must be closed during the measurement so there is no gas exchange with the ambient medium or with the tanks, which would completely falsify the permeability measurement. This means that the valves 128, 122, 120, 127, 118, 110 and 117 must be closed.

The anode and cathode circuits of the fuel cell stack must of course be extremely well sealed with respect to the ambient environment, otherwise the pressure variations would be disturbed by any exchange with the outside and make the permeability measurement inoperable. Furthermore, the recirculating pumps 115 and 125 and the booster pump 129 must be stopped so as not to disturb the measurement.

As an example of an advantageous implementation of the invention, since the sealing of the stack with respect to the ambient environment is a necessary condition for being able to measure the permeability of the membranes, it is proposed, upon each shut-down, to verify how the sum, possibly weighted, (or the average, possibly weighted), of the pressure in the cathode circuit and of the pressure in the anode circuit evolves and to validate the measurement of the dynamic behaviour if the sum (or the average) remains substantially constant for a predetermined time period. If the anode and cathode circuits have different volumes, the respective pressures would have to be weighted in order to calculate the average pressure. Ignoring the pressure variation due to the possible slow temperature variation, if the two, anode and cathode, circuits are sealed with respect to the ambient environment, the sum (or the average) must remain substantially constant. In other words, the average pressure must remain steady. Outside the permeability measurement, it is always advantageous to know if a leak has appeared in the fuel cell stack.

The invention claimed is:

1. A procedure for detecting the permeability state of a polymeric ion-exchange membrane of a fuel cell stack, the fuel cell stack being formed by stacking electrochemical cells each having an anode and a cathode, said anode and said cathode being arranged on respective sides of the polymeric ion-exchange membrane, the fuel cell stack having a fuel gas supply circuit on the anode side of the electrochemical cells and an oxidant gas supply circuit on the cathode side of the electrochemical cells, wherein the procedure comprises, upon each shut-down of the fuel cell stack, measuring dynamic behavior as pressure in the anode side circuit and pressure in the cathode side circuit come to equilibrium and, when said behavior exhibits pre-identified characteristic signs, activating a warning signal indicating that the fuel cell stack requires inspection, wherein, as soon as a pressure difference in the anode side and cathode side circuits drops to a value below a threshold value $P_S$, a pressure variation in said circuits during a predetermined time period $t_C$ is measured and a pressure difference in these circuits at the end of a redetermined time period called the control pressure $P_C$, is calculated and a warning is given when the control pressure $P_C$ is below a warning threshold $P_A$.

2. The procedure for detecting the permeability state of the polymeric ion-exchange membrane of a fuel cell stack according to claim 1, wherein the threshold value $P_S$ is equal to 500 mbar.

3. The procedure for detecting the permeability state of the polymeric ion-exchange membrane of a fuel cell stack according to claim 2, wherein the warning pressure $P_A$ is equal to 400 mbar.

4. The procedure for detecting the permeability state of the polymeric ion-exchange membrane of a fuel cell stack according to claim 1, preceded by a procedure for shutting down the fuel cell stack, the latter delivering an electrical voltage to an electrical power line, the procedure for shutting down the fuel cell stack comprising the following actions:

(i) a supply of fuel gas and oxidant gas is cut off;
(ii) current continues to be drawn as long as an appropriate indicator indicates that oxidant gas in the oxidant gas supply system has not been sufficiently consumed; and
(iii) nitrogen enriched gas is injected into the oxidant gas supply system.

5. The procedure for detecting the permeability state of the polymeric ion-exchange membrane of a fuel cell stack according to claim 1, for a fuel cell stack comprising an oxidant gas supply system on the cathode side of the electrochemical cells, the oxidant gas supply circuit comprising a shut-off valve placed at the outlet of an oxygen storage tank and a device configured to be fillable with pressurized atmospheric air and a recycling circuit connected to an outlet of the cathode side circuit of the fuel cell stack, with a water separator before a return and a connection to an oxidant gas supply line.

6. A procedure for detecting the permeability state of a polymeric ion-exchange membrane of a fuel cell stack, the fuel cell stack being formed by stacking electrochemical cells each having an anode and a cathode, said anode and said cathode being arranged on respective sides of the polymeric ion-exchange membrane, the fuel cell stack having a fuel gas supply circuit on the anode side of the electrochemical cells and an oxidant gas supply circuit on the cathode side of the electrochemical cells, wherein the procedure comprises, upon each shut-down of the fuel cell stack, measuring dynamic behavior as pressure in the anode side circuit and pressure in the cathode side circuit come to equilibrium and, when said behavior exhibits pre-identified characteristic signs, activating a warning signal indicating that the fuel cell stack requires inspection, wherein, upon each shut-down, a variation in a weighted sum of the pressure in the cathode side circuit and of the pressure in the anode side circuit is observed and the measurement of the dynamic behavior is validated if the weighted sum remains substantially constant for a predetermined time period.

7. A procedure for detecting the permeability state of a polymeric ion-exchange membrane of a fuel cell stack, the fuel cell stack (1) being formed by stacking electrochemical cells each having an anode and a cathode, said anode and said cathode being arranged on respective sides of the polymeric ion-exchange membrane, the fuel cell stack having a fuel gas supply circuit on the anode side of the electrochemical cells and an oxidant gas supply circuit on the cathode side of the electrochemical cells, wherein the procedure comprises, upon each shut-down of the fuel cell stack, measuring dynamic behavior as pressure in the anode side circuit and pressure in the cathode side circuit come to equilibrium and, when said behavior exhibits pre-identified characteristic signs, activating a warning signal indicating that the fuel cell stack requires inspection, wherein, upon each shut-down, an evolution of a weighted average of the pressure in the cathode side circuit and of the pressure in the anode side circuit is observed and the measurement of the dynamic behavior is validated if the weighted average remains substantially constant for a predetermined time period.

8. The procedure for detecting the permeability state of the polymeric ion-exchange membrane of a fuel cell stack, according to claim 4, wherein the actions (i), (ii) and (iii) are concomitant.

9. The procedure for detecting the permeability state of the polymeric ion-exchange membrane of a fuel cell stack, according to claim 4, wherein the actions (ii) and (iii) are successive steps, the two actions (i) and (ii) being concomitant.

10. The procedure for detecting the permeability state of the polymeric ion-exchange membrane of a fuel cell stack, according to claim 4, which further includes, after the action (iii), a fuel gas suction step.

11. The procedure for detecting the permeability state of the polymeric ion-exchange membrane of a fuel cell stack, according to claim 4, for a fuel cell stack supplied with pure oxygen as oxidant, the nitrogen enriched gas being atmospheric air.

12. The procedure for detecting the permeability state of the polymeric ion-exchange membrane of a fuel cell stack, according to claim 4, wherein an action of interrupting the fuel gas supply is delayed relative to an action of interrupting the oxidant gas supply.

13. The procedure for detecting the permeability state of the polymeric ion-exchange membrane of a fuel cell stack, according to claim 4, wherein the oxidant gas is pure oxygen and the supply of pure oxygen and the fuel gas supply are interrupted simultaneously.

14. The procedure for detecting the permeability state of the polymeric ion-exchange membrane of a fuel cell stack, according to claim 4, wherein the current draw is firstly set at a first level, it is then reduced at the same time as certain cells of the fuel cell stack start to drop in voltage, and finally it becomes zero when the voltage of the fuel cell stack approaches 0 V.

15. The procedure for detecting the permeability state of the polymeric ion-exchange membrane of a fuel cell stack according to claim 1, wherein upon completion of the shutdown procedure a pressure difference remains between the anode side circuit and the cathode side circuit, and the dynamic behavior comprises a time needed for the pressure of the anode side circuit and the pressure of the cathode side circuit to reach equilibrium.

* * * * *